Jan. 17, 1928.
C. S. SWANEY
1,656,302
BEARING CLEARANCE MICROMETER
Filed May 10, 1924 2 Sheets-Sheet 1
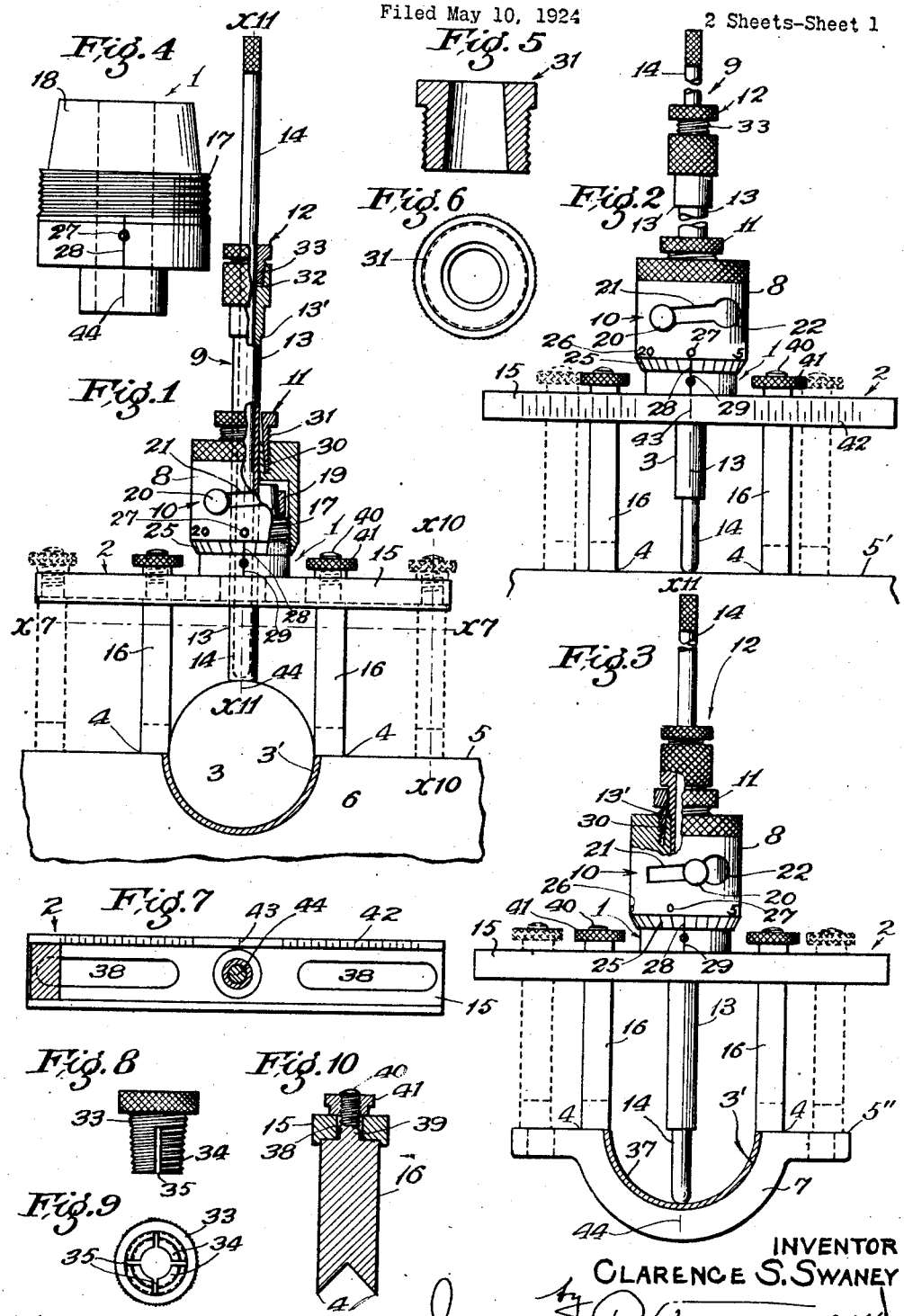
INVENTOR
CLARENCE S. SWANEY Jan. 17, 1928.
C. S. SWANEY
1,656,302
BEARING CLEARANCE MICROMETER
Filed May 10, 1924     2 Sheets-Sheet 2
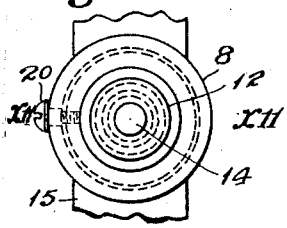
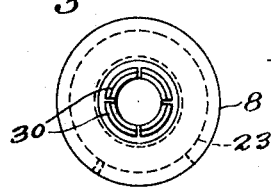
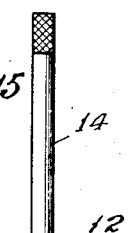
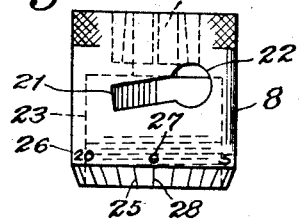
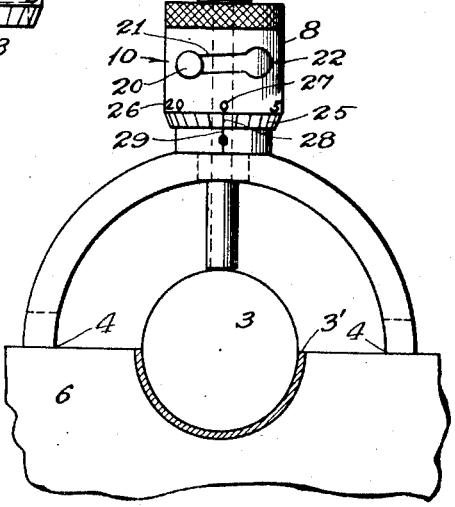
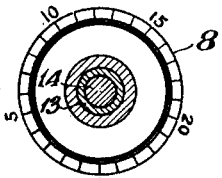
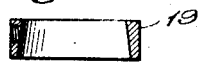
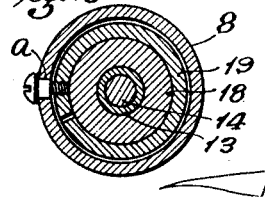
WITNESS:
J. A. McDowell
INVENTOR
CLARENCE S. SWANEY
by James R. Townsend
his Atty Patented Jan. 17, 1928.

1,656,302

UNITED STATES PATENT OFFICE.

CLARENCE S. SWANEY, OF LOS ANGELES, CALIFORNIA.

BEARING-CLEARANCE MICROMETER.

Application filed May 10, 1924. Serial No. 712,174.

This invention relates to a device for determining the difference between the diameters of a journal and the bearing therefor, for the purpose of taking up clearance.

After an engine has been used for a time, a knock is developed therein that is caused by a loose bearing due to the wear and tear of the engine. The looseness of the affected bearing or bearings must be taken up; and an object of this invention is to provide means for readily measuring and easily reading the measurements of worn clearance between shaft journals and split-type bearings in thousandths of an inch, so that the bearing or bearings will be free but not loose.

Another object is to provide a novel clearance micrometer for making measurements of this description and which will be cheap, simple and easy to construct and with which the measurements may be determined accurately to a thousandth of an inch on split-type bearings.

The invention is applicable for use with all split bearings and enables the workman to determine the projection of a journal from its fixed half bearing, and the depth and clearance of the detachable half bearings, indicating the number of thousandths of an inch to be removed from either or both of the meeting faces of the bearing block and cap.

It is also applicable for determining the longitudinal alinement of the bearings with the shaft journals.

An object is to enable the workman to insure that the depth of the bearing surface from the meeting face of the bearing block or cap shall be the same at each end of the bearing.

Another object is an easy means of locking the parts in the measuring position without disarranging the adjustment.

Sometimes the journal may be worn to a slight taper or the bearing may be working too freely or too low in the cap, thus requiring that the cap be dressed down to bearing height; to all of which uses this tool is applicable in obtaining and maintaining practically exact bearing alinement and accuracy.

The invention is also adapted to the measurement of shims or shim stock in thousandths of an inch by placing the same on any plane surface between scale bar uprights.

The invention is also adapted for use in determining whether bearing journals have become worn out of their original true roundness.

The invention is broadly new, basic and pioneer in that I provide in combination with a gage bar and means to maintain the same in definite relation and position across the journal bearing surface or to the journal in place therein; two members longitudinally movable with relation to each other and adapted to be brought into contact with the surface to be located, relative to other surfaces by adjustment of said members relative to each other and relative to a predetermined support for said gage bar; means for adjusting the members relative to each other and to the gage bar; and means for indicating the adjustment of said members relative to the part to be measured.

In practice I position the gage bar relative to the bearing for the journal by means of two gage bar positioning members which are adapted to contact with the bearing block. Said bar adjusting members are adjustable relative to the bar so that they may be positioned as required on the face of the bearing block when the measurement is to be taken. Means are also provided for locking the parts in the relative positions.

An object is to make it possible to secure perfect accuracy with rapid measurement.

Other objects, advantages and features of invention may appear from the accompanying drawing, the subjoined detail description and the appended claims.

The invention is applicable in different ways and I do not limit the embodiment thereof to specific forms of construction.

The accompanying drawings illustrate the invention as applied in two forms and shows positions of the parts in different kinds and at different periods of measurement.

Figure 1 is an elevation of a device embodying the invention as applied to the first step in measuring a journal while it is in a bearing block, a fragment of which is shown; parts are broken away to expose parts that would otherwise be hidden.

Fig. 2 is an elevation of the device standing on a flat surface and illustrating a second step in the use of the invention; parts are broken out to contract the view.

Fig. 3 is a fragmental front elevation of the device in position to measure the journal bearing cap which is shown detached.

Fig. 4 is an enlarged view of the base detached.

Fig. 5 is a sectional detail of the hollow clamping screw of the slide carriers.

Fig. 6 is a view of the hollow clamping screw looking up in Fig. 5.

Fig. 7 is a section on line $x^7$, Fig. 1 looking up at the adjustment and omitting one of the supporting legs.

Fig. 8 is a detail of the hollow clamping screw for locking the slide members relative to each other.

Fig. 9 is an end view of Fig. 8 looking from below to show the clamping tongues and the knurled edge.

Fig. 10 is a section on line $x^{10}$, of the base support shown in Fig. 1.

Fig. 11 is a section generally indicated by line $x^{11}$, Fig. 1; the parts being adjusted to somewhat different positions from those shown in Fig. 1.

Fig. 12 is a partial plan view of Fig. 1.

Fig. 13 is an enlarged detached plan view of the graduated slide carrier.

Fig. 14 is an elevation of the slide carrier shown in Fig. 13.

Fig. 15 is a view similar to Fig. 1, showing the invention having a non-adjustable scale support in position for measuring the projection of a journal in a bearing block, a fragment of which is shown.

Fig. 16 is a side elevation of the support shown in Fig. 15.

Fig. 17 is a section on line $x^{17}$, Fig. 11 looking up; omitting the base support; and showing indicating ordinals around the graduations of the carrier.

Fig. 18 is a section on line $x^{18}$, Fig. 11, showing the carrier locking shoe and its handle, in place.

Fig 19 is a section on line $x^{19}$, Fig. 20, of the carrier locking shoe.

Fig. 20 is a view of the carrier locking shoe shown in Figs. 18 and 19, looking from below.

This class of instrument is designed to duplicate in the concavity of a half bearing, the projection of a journal from the corresponding half bearing; and also to duplicate in a half bearing the projection of a journal when the same is seated in the mate to such half bearing.

The invention comprises, in combination, a base 1, a support 2, therefor, adapted to span a journal as at 3 and its bearing as at 3′, in Figs. 1 and 15, and having supporting termini 4, in a common plane as indicated at 5, 5′ and 5″; and adapted to span said bearing as in Fig. 1, and to rest on the meeting face of the bearing block 6, or cap 7 containing the bearing.

8 is a slide carrier micrometrically adjustable on the base 1, toward and from said plane 5.

9 is a telescopic slide carried by and adjustable, relative to, the carrier, and toward and from plane 5; carrier fixing means 10 are provided to fix the carrier 8 relative to the base 1; slide fastening or locking means 11 are provided to fix the slide 9 relative to the carrier; and slide member fixing means 12 are provided to fix the slide members 13 and 14 relative to each other. Preferably the outer slide member 13 is a tube and the inner slide member 14 is a rod, and they will be hereafter so designated.

In Figs. 1, 2, 3 and 11 the base 1 is fixed to a support bar 15 that is supported by legs 16 terminating in the terminal points 4; and said legs are horizontally adjustable along the bar 15 toward and from the base 1.

Said base 1 is shown in the drawing as being cylindrical and externally screw threaded to receive the carrier 8 which is screwed upon the thread 17 that is of suitable fineness, as, for instance, 40 threads to the inch.

The upper portion 18 of the base is tapered to receive a carrier locking shoe 19, which is provided with a stud 20 extending through an inclined slot 21 in the carrier. The inclination of the slot is sufficiently slight to allow the shoe to be moved longitudinally of the carrier to wedge between the carrier and the taper portion of the base with sufficient force to fix the carrier to the base when the stud is swung around toward the lower end of the inclined slot.

As the stud is moved along the slot, the shoe is adjusted on the taper portion of the base to fix it upon or to loosen it from the base and to hold the carrier at whatever point it may be desired within a narrow limit of thread travel. That is to say, this arrangement of the slotted slide carrier threaded on the base with the carrier locking shoe between the slide carrier and the taper portion of the base causes the movement of the shoe lengthwise of the carrier and base to frictionally lock the carrier and base together at any adjusted position within the range of the micrometric adjustment.

When the shoe is shifted from wedging position, the carrier may be shifted micrometrically toward and from the bottom of the base by slightly revolving the carrier on the base, and when the carrier is adjusted to the desired position it is readily fixed in such position by moving the stud in the inclined slot, thus shifting the shoe to wedging position on the taper portion of the base.

The stud is shown flat sided as at $a$ to snugly fit the sides of the slot and to be held from turning while being moved to shift the shoe. Said slot 21 has an enlargement 22 at its upper end to allow the stud to be turned to screw the stud into and out of the shoe for assembly and disassembly. The head of the stud forms a thumb-piece to shift the stud and the shoe along the slot lengthwise of the base and carrier thus to move the shoe to and from wedging position.

When the carrier 8 is unlocked from the base, the carrier can be turned on the thread of the base, thus screwing the carrier up or down to a desired position at which it may be firmly fixed or set by pushing the handle along the slanting slot 21 away from the enlargement 22 thereof. The adjusted relation of carrier and base is thus fixed without any likelihood of disturbing the adjustment between those parts in the course of locking them together.

The lower end of the carrier 8 is recessed as at 23 to accommodate the base and collar, and is threaded to the base below the recessed portion thereof.

The carrier is chamfered at its lower end 24 to meet the outside cylindrical surface of the base; and the chamfered portion is provided with graduations 25 distinguished by ordinals 26 reading from a zero point 27 and having a zero graduation line 28 adapted to be alined with a zero setting mark 29 on the base 1.

The slide members 13 and 14 are telescopic, the member 13 preferably being hollow as shown in the drawings, and the rod member 14 being inserted therein with a working fit so that the members 13 and 14 are relatively adjustable. The hollow outer slide member 13 extends down through the base and through the bar 15 of the support and is adapted to be brought into contact at its lower end with the surface, as the journal 3, the projection of which is to be measured as in Fig. 1, the inner telescopic member 14 is adapted to slide in, and to be made flush with, as in Figs. 1 and 15, or to be projected beyond, the lower end of the outer slide member, as shown in Figs. 2, 3 and 11.

The outer slide member 13 is adapted to be fixed with relation to the carrier by means of spring tongues 30 fixed to the carrier 8. Said tongues are adapted to be sprung inwardly to engage the outer member. This is done by the locking means 11 comprising the internally tapered and externally threaded hollow screw 31 which encloses and fits upon the tongues 30, that are tapered so that when the hollow screw is screwed down to compress the tongues 30 onto the outside of the outer member 13, such member will be clamped to the carrier.

The upper end of the hollow slide member 13 is provided with a hollow socket 32 to receive the split hollow screw 33 which has spring tongues 34 separated by slots 35 and externally threaded and tapered to screw into the tapered threaded socket 32 so that the tongues 34 will be compressed to grip the inner member or rod 14 when the hollow clamp 12 is turned for that purpose.

The tubular slide member 13 is provided below its upper end with a stop formed by a shoulder 13′ adapted to pass through the upper end of the hollow clamp screw 31 and to come to rest upon the top of the slide carrier 8 when the slide carrier is locked at zero, the clamp screw 31 is loosened, and the end of the slide member 13 reaches the plane of the termini 4 of the support 2. To this end the length of slide member 13 from the shoulder 13′ to the end of the slide is equal to the distance between the top of the clamping tongues 30 and the common plane of the termini 4, so that when the slide member is free to descend, its lower end will invariably stand flush with the termini of the support legs, and any depression in the surface on which the termini rests can be engaged by the other slide member or rod 14 which can be made to project to accomplish this purpose.

The support or scale bar 15 is shown as having slots 38 on opposite sides of the base 1, and the upper ends of the legs 16 are provided with studs 39 slidable along the slots 38, and having threaded terminals 40 for clamp nuts 41, by which the legs may be secured in any adjusted position by screwing the nuts down onto the bar, the object being to center the guide between the termini.

Ordinarily when the device is not in use the locking devices 10, 11 and 12 will be tightened to prevent looseness or loss of any of the parts.

The bar 15 is provided with graduations 42 symmetrically arranged on opposite sides of a center mark 43, which is aligned transversely of the bar 15 with the produced axis 44 of the base, which is also the axis of the slide rod 14 and the slide tube 13.

When it is desired to measure the projection of a journal from a half bearing, in which it is seated, the locking means 12 will be loosened so that slide rod 14 may be moved lengthwise and then the locking means 11 are loosened so that the slide tube 13 may be moved lengthwise, and the slide formed by the two members 13 and 14 will be drawn up to allow the legs 16 to rest on the meeting face of the bearing block 6 when the support or scale bar 15 is brought into journal spanning position as indicated in Fig. 1.

In the form shown in Figs. 1, 2, 3 and 11 the gage or support bar 15 is mounted on legs 16 cloven at the bottom to form the termini 4 in a common plane to rest upon the meeting face 5 or 5′ of the bearing block 6 or cap 7, and said legs 16 are adjustable along the support bar 15 as indicated by the dotted and solid line positions shown in Fig. 1, so that the legs may be brought against the opposite sides of the journal in the bearing, as indicated in solid lines in Fig. 1, or to the margins of the recess at 3′ in Fig. 3 in the journal or bearing lining 37. The cloven ends of the legs 16 terminate in a common plane at right angles to the axis of the slide so that the movement of the slide will be at right angles to the plane of the meeting face of the half bearing measured.

Preferably the gage bar 15 is straight as shown in Figs. 1, 2 and 3; and the legs are straight uprights; and their inner faces are at right angles to the under face of said bar and said straight upright faces are adapted to be brought against the sides of the journal as shown in Fig. 1, or edges of the half bearing as shown in Fig. 3.

The parts are so proportioned that when the tube 13 is free to drop, the shoulder 13' will come to rest on the clamping tongues 30 when the lower end of the tube 13 is in the plane of the lower ends of the legs 16.

In practical use the zero lines 28 and 29 will be aligned with each other as shown in Fig. 1, and the legs 16 will be brought to equal distances apart from said zero lines and in touch with the sides of the journal 3 in the journal bearing 3' from which the journal projects; and the slide members 13 and 14 being loosened from each other and from the carrier, will come to rest on the crown of the journal projection as shown in Fig. 1; then the outer slide member 13 will be fixed with relation to the carrier 8 by turning the hollow screw 11; then the instrument will be removed from the half bearing shown in Fig. 1, to a plane surface as 5' shown in Fig. 2 and the inner member 14 of the slide will be allowed to come into touch with the plane 5' upon which the legs 16 are at rest; then the slide members will be locked together by turning the hollow screw 12.

Then the hollow screw 11 will be turned to release the tubular member of the slide so that when the instrument is lifted and placed upon the half bearing as shown in Fig. 3, the hollow slide member or tube will drop down until the shoulder 13' comes to rest on the ends of the clamping tongues 30. Such drop equals the projection of the journal at its first adjustment in Fig. 1, thus bringing the lower end of the tubular member to a level with the plane upon which the legs 16 rest as in Fig. 3.

The shoulder 13' at rest upon the top of the tongues 30 of the carrier determines this adjustment of the tubular slide member 13. During this dropping of the tubular member 13 the two slide members remain locked together; and when the slide is stopped by contact of the shoulders 13' with the tops of the tongues 30 of the base carrier, whatever clearance there may be, due to wear, or other cause, will be indicated by a space between the tip of the inner member or rod 14 and the bottom of the concave bearing. Then by releasing the carrier from the base and turning the carrier to screw it down until the tip of the slide member 14, comes into contact with the bearing. The micrometric reading of the scale on the carrier indicates to the thousandth of an inch, the clearance.

That is to say, when the slide rod 14 is locked inside the tube 13, both are pulled up and locked in relation to the scale bar uprights which are set approximately to the journal diameter, and may be placed on the half bearing 5 astraddle of the journal, and the tube 13 brought down into contact with the crown of the journal and locked. The micrometer device is then lifted from the half bearing at 5, and placed on a plane surface 5'; and the rod 14 is thus unlocked from tube 13, the position of which tube relative to the bottom of legs 16 is determined by the shoulder 13' resting on the tips of the clamp tongues 30, as indicated in Fig. 11.

The rod 14 is then moved down to project out of tube 13 to touch said plane surface 5', and is then locked in position in the tube 13 so that the slide is practically a unit. Lock 11 of tube 13 is then released and the slide is then pushed down to bring tube 13 to the original position, which position is determined by the shoulder stop 13' on the tips of the tongues 30.

The micrometer device is then placed with its legs on the bearing cap 5'', and the carrier 8 is unlocked by moving the stud 20, and turned to the right, thus screwing it until the tip of the rod 14 comes into contact with the bearing surface and shows by graduations on the carrier 8, and zero line on the base 1, the number of thousandths of an inch of clearance there is between the bearing journal and bearing the clamp nuts 41 are then released and the legs 16 are adjusted to contact with the sides of the journal 3; care being taken by reference to the graduations 42, that the legs are symmetrically disposed on opposite sides of the center line 43.

Then the clamp nuts 41 are tightened and the locking devices 11 and 12 are tightened while both slide members are in contact with the crown of the journal.

The legs are placed on the flat plane as indicated in Fig. 2, and the slide rod 14 is shoved down through the tube 13 until the point of the slide rod contacts with the flat plane surface as shown in Fig. 2.

Then the locking device 12 is again locked. Then lock 11 is released and the slide tube is slid down as in Fig. 3, thus lowering the slide rod 14, which is fixed to the tube 13 by the locking means 12.

Then the device is seated upon the meeting face 5' of the detached half bearing 7, and then lock 10 is released and carrier 8 turned clock-wise in the direction of the arrow until the tip of sliding rod 14 comes in contact with the bearing surface 3'. The graduations on slide bar carrier 8 will then indicate to the thousandth of an inch the clearance space.

Such clearance space is the exact difference between the journal diameter and journal bearing diameter, and indicates the thickness of material to be removed from the meeting face, or the required reduction of shimming.

The function of the carrier 8 is to show by the graduation thereon in thousandths of an inch the final few thousandths of an inch, up and down adjustment of the carrier, and this is the difference due to wear existing between the crown of the projected half of the journal, and the depth of the concavity of the detached half bearing.

The graduation marks 25 in combination with the threads 17 constitute a micrometric scale and the spaces between the graduation marks may be made to indicate any measurement desired as one thousandth of an inch more or less.

With 25 scale marks equally dividing the circumference of the carrier, 40 threads to an inch will give one thousandth of an inch longitudinal carrier travel to each graduation space as the carrier is turned.

Any suitable combination of thread and marking may be adopted within the judgment of the tool marker.

I claim:

1. A base, a support therefor having supporting termini in a common plane and adapted to span a bearing and to rest on the meeting face of the bearing block or cap containing such bearing; a slide carrier micrometrically adjustable on the base toward and from said plane; a telescopic slide compressing slide members carried by and adjustable, relative to the carrier and toward and from said plane; means to fix the carrier relative to the base; means to fix the slide relative to the carrier; and means to fix the slide members relative to each other.

2. A bearing clearance micrometer comprising a support adapted to rest on the meeting face of a half bearing; a cylindrical base externally threaded and mounted on said support; a tube extending through the support and adapted to be moved axially therein; a slide carrier screwed onto the base and carrying said tube and; means to adjustably fasten the tube to the carrier.

3. A bearing clearance micrometer comprising a support adapted to rest on the meeting face of a half bearing; a cylindrical base externally threaded and mounted on said support; a tube extending through the support and adapted to be moved axially therein; a slide carrier screwed onto the base and carrying said tube; means to fix the carrier to the base and; means to adjustably fasten the tube to the carrier.

4. In a bearing clearance micrometer comprising a base; a slidable member; a carrier for said slide member threaded onto the base, and having a slanting slot therein; said base having a taper portion; a shoe to wedge the base and carrier together; and a stud fixed to the shoe and extending through the slot so that when the stud is moved along the slot in one direction the shoe will be wedged between the taper base and the carrier, and when the stud is moved in the other direction the shoe will be loosened to allow the carrier to be turned on the base.

5. In a bearing clearance micrometer provided with a support; a base having a taper portion and mounted on said support; a slide carrier screwed onto the base and adapted for micrometric adjustment relative to the base, and provided with a peripheral oblique slot; and a shoe arranged between the base and slide carrier, and having means extending through the slot and engaging the edges of the slot and adapted to frictionally lock the carrier to the base when said means are moved in one direction along the slot, and to release said carrier when said means are moved in the reverse direction.

6. A bearing clearance micrometer comprising a support; a base fixed to the support and provided with a zero line and threaded to receive a slide carrier; a slide carrier screwed onto the threaded base and provided with graduations and a zero line adapted to register with the zero line of the base; a slide comprising two members; means for adjustably locking the slide to the carrier; and means for adjustably locking the slide members together.

7. A bearing clearance micrometer comprising a base; a support for the base; a slide comprising two members adjustable with relation to each other and to the base; and rotary means for locking the slide and the carrier together.

8. In a bearing clearance micrometer, the combination with a slide therefor comprising a tube member and a rod member; of a taper threaded locking member; a taper threaded member to receive the locking member, one of said members being adapted to engage a slide member to connect it to another slide member when the locking members are screwed upon each other.

9. In a device of the character set forth provided with a base support; a base supported thereby; a slide carrier threaded to the base; and a slide composed of a tube and a rod sliding in the tube; means for locking the tube and rod together; clamping means comprising tongues carried by the carrier and a threaded hollow screw adapted to bend said clamping means to clamp the tube; said tube being provided with a shouldered portion adapted to extend into the clamping screw and adapted to rest upon said tongues to form a stop for the tube relative to the slide carrier.

10. The combination with a support a slide composed of two members adjustable in longitudinal relation to each other; means to adjust the slide micrometrically relative to the support; means for stopping the slide with the end of one of its members in the terminal plane of the support; and means to lock the slide members together.

In testimony whereof, I have hereunto set my hand at Los Angeles, California, this 16th day of April, 1924.

CLARENCE S. SWANEY.